United States Patent [19]

Sprague

[11] Patent Number: 4,885,863
[45] Date of Patent: * Dec. 12, 1989

[54] FISHING LURE RETRIEVER

[76] Inventor: Michael M. Sprague, 16843 4th Ave., South, Seattle, Wash. 98148

[ * ] Notice: The portion of the term of this patent subsequent to Jul. 12, 2005 has been disclaimed.

[21] Appl. No.: 198,323
[22] Filed: May 25, 1988
[51] Int. Cl.[4] ............................................. A01K 97/00
[52] U.S. Cl. .................................................... 43/17.2
[58] Field of Search ......................................... 43/17.2
[56] References Cited

U.S. PATENT DOCUMENTS

| 2,479,448 | 8/1949 | Woock . | |
| 2,760,810 | 8/1956 | Smith . | |
| 2,807,906 | 10/1957 | Mun | 43/17.2 |
| 2,826,849 | 3/1958 | Frederick | 43/17.2 |
| 2,827,730 | 3/1958 | Hunt | 43/17.2 |
| 2,909,861 | 10/1959 | Leming | 43/17.2 |
| 2,915,845 | 12/1959 | Hughes | 43/17.2 |
| 3,550,303 | 12/1970 | Western | 43/17.2 |
| 4,085,537 | 4/1978 | Todd | 43/17.2 |
| 4,536,984 | 8/1985 | Kowal | 43/17.2 |
| 4,756,112 | 7/1988 | Sprague | 43/17.2 |

Primary Examiner—Kurt Rowan
Attorney, Agent, or Firm—Christensen, O'Connor, Johnson & Kindness

[57] ABSTRACT

A device for retrieving fishing lures that have become snagged on an underwater obstruction such as a rock or tree stump. The retriever includes a weighted body having a unique system of opposing guideways adapted to slidably engage a fishing line attached to the snagged lure, and a unique trap section at its forward end. The guideways are formed entirely by converging walls of the body and are interconnected by cross slots. The trap section includes a plurality of staggered hooks of varying length which extend forward from the body and are intended to engage some portion, especially the eye, of the snagged lure. After the lure is captured by the retriever, both may be recovered by means of a retrieve line attached to the retriever body which has a considerably higher tensile strength than the fishing line.

8 Claims, 3 Drawing Sheets

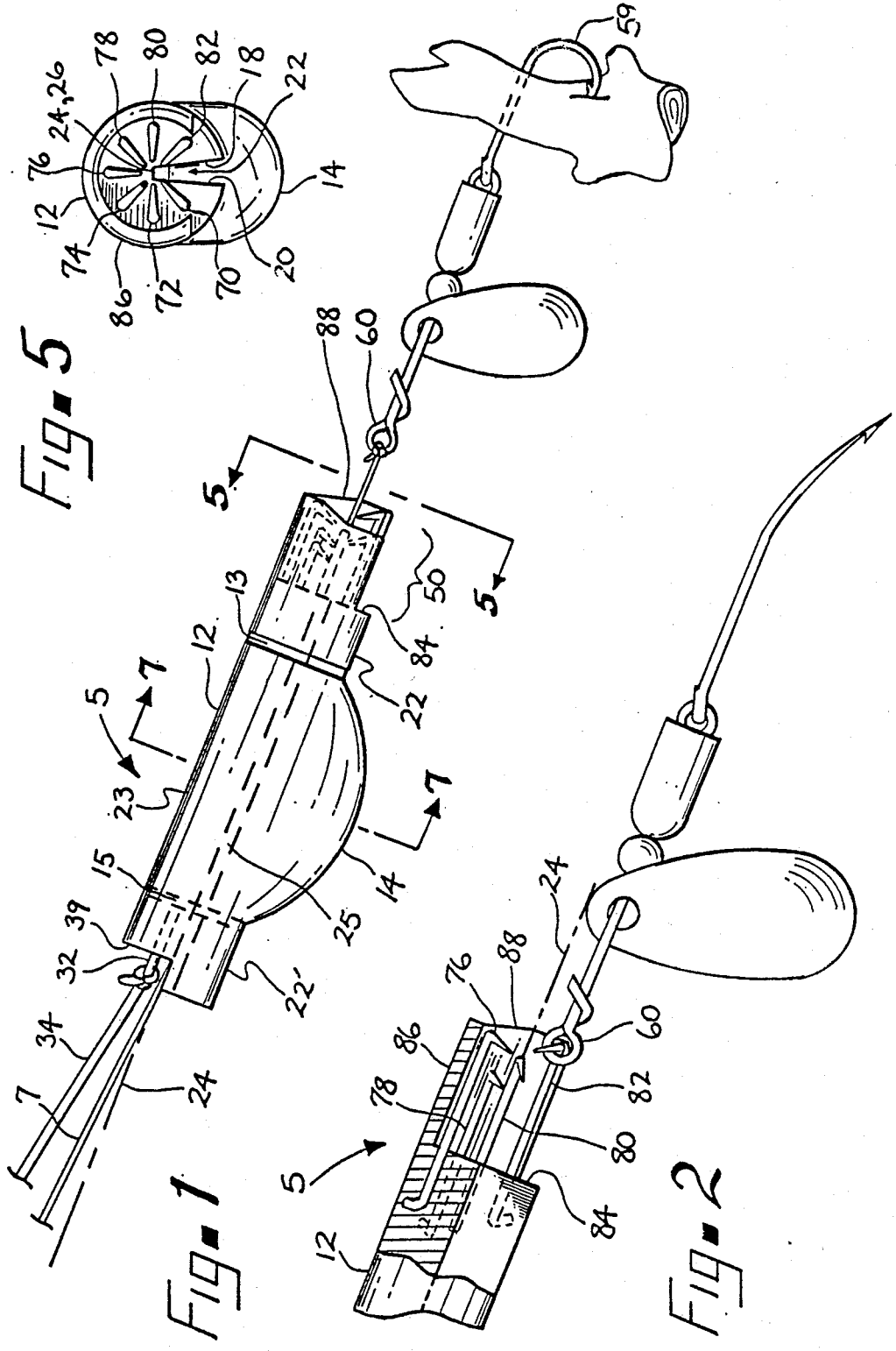

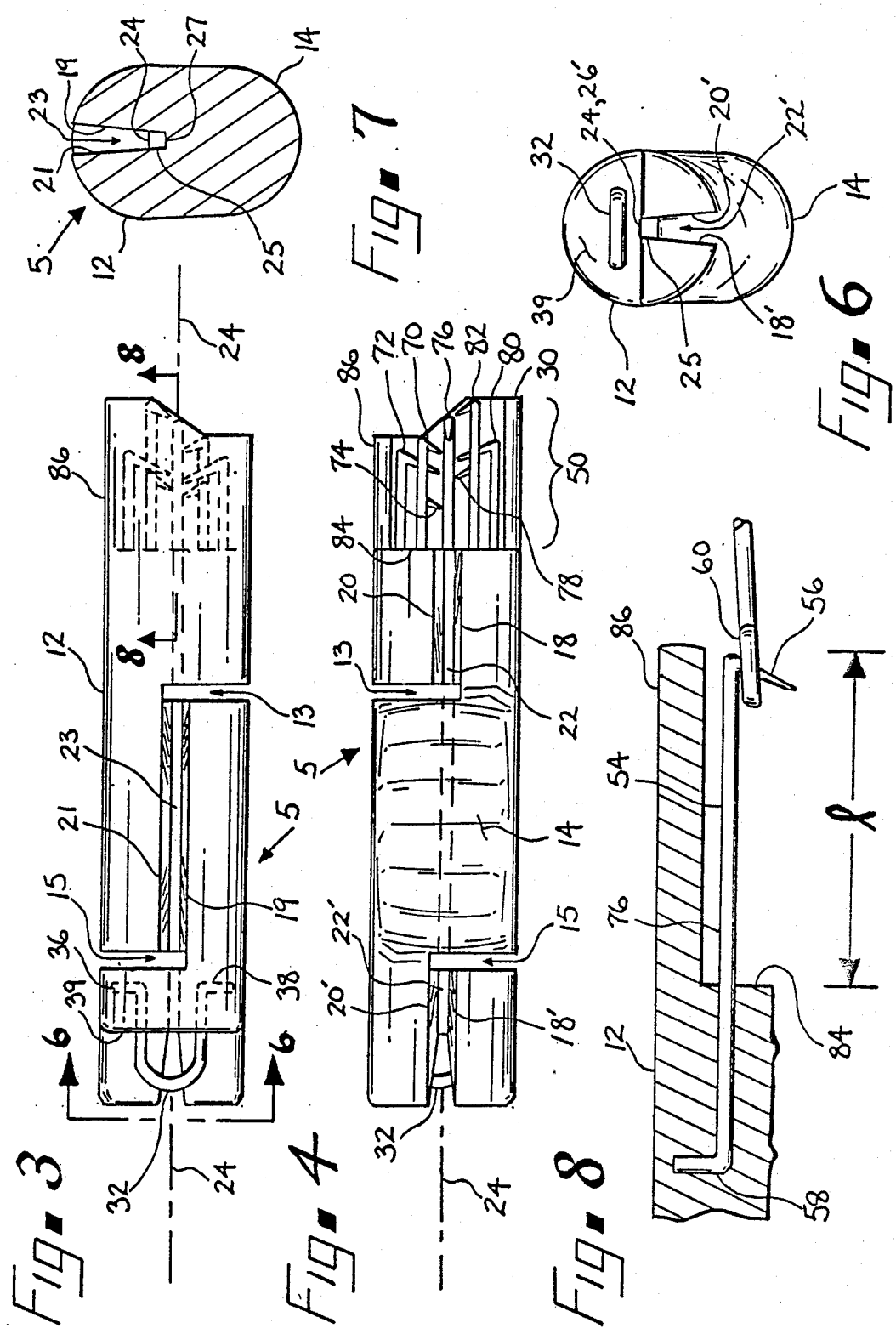

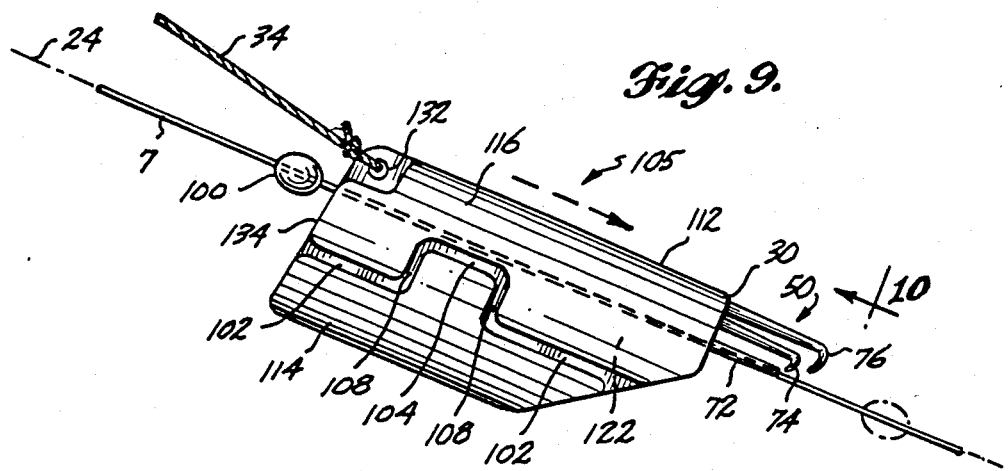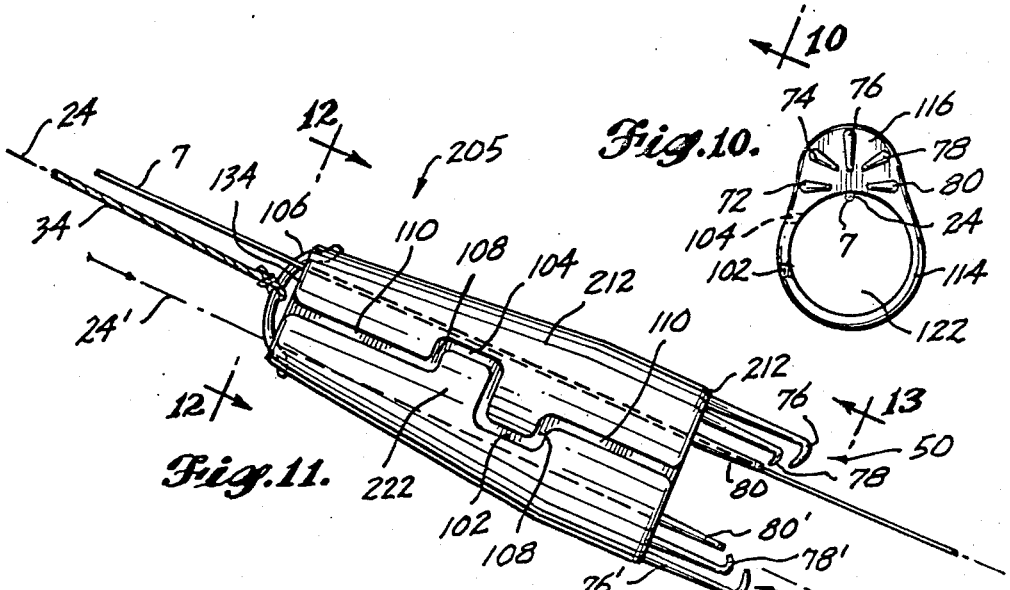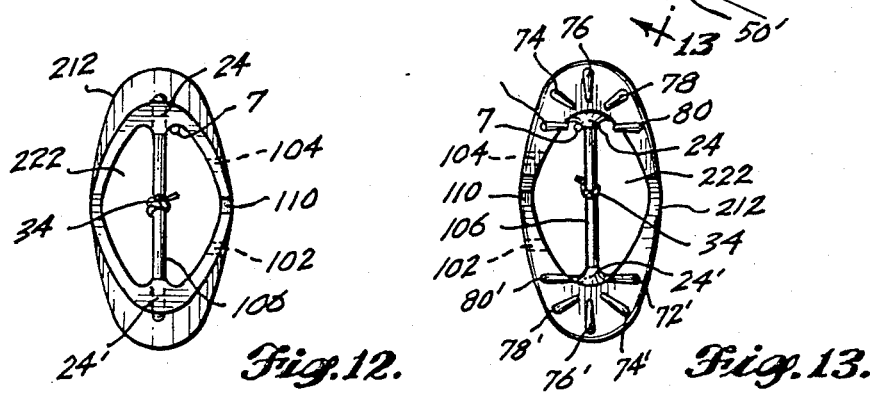

4,885,863

FISHING LURE RETRIEVER

This application is a continuation-in-part of pending U.S. patent application, Ser. No. 928,191, filed November 7, 1986, which is a continuation-in-part of abandoned application Ser. No. 815,514, filed January 2, 1986, on a FISHING LURE RETRIEVER, by the present applicant. The invention relates generally to fishing equipment and, more particularly, to a device for recovering snagged fishing lures.

BACKGROUND OF THE INVENTION

Fishing lures seldom wear out. They are most commonly lost when they accidentally become snagged on a submerged rock or tree stump. Although the lure body may become wedged in the obstruction, it is more likely that the fishing hooks attached to the body will penetrate or become caught in it. In that case, if the fishing line were strong enough, the fisherman operating the lure could retrieve it simply by pulling on the fishing line until the hook bent and the lure was freed. Fishing line typically used today by sports fishermen is far too low in tensile strength to bend the hooks, so unless the lure can be freed by gentle pulling from another direction or by jiggling, it will have to be abandoned in a watery grave.

There have been numerous attempts throughout the years to develop a practical means to retrieve snagged fishing lures, but most such devices have failed commercially either because they were too expensive in relation to the cosst of a lure or because they simly did not work well. Also, because of certain design deficiencies, some earlier retrievers that functioned satisfactorily with one type of lure would not work with others.

Accordingly, it is an object of this invention to provide for a fishing lure retriever which can be used effectively to recover all common types of fishing lures.

It is another object of this invention to provide for a fishing lure retriever which can be manufactured and sold for a reasonable cost in relation to the cost of a typical fishing lure.

It is another object of this invention to provide for a fishing lure retriever having a unique arrangement of staggered trap hooks of varying lengths which will have a higher probability of securely engaging a snagged lure than previously known retrievers.

It is a further object of this invention to provide for a fishing lure retriever having a unique system of opposing guideways for securely but slidably engaging a fishing line attached to the lure, which system has no moving or projecting parts subject to damage or wear, and requires minimal effort for a fisherman to operate.

A yet further object of this invention is to provide for a fishing lure retriever which because of its relatively simple design and construction is very durable and useful in both fresh and salt water.

SUMMARY OF THE INVENTION

This invention can be broadly summarized as providing for a fishing lure retriever having a weighted body including means for slidably engaging a fishing line attached to the snagged lure, which engaging means defines an axis with respect to the body, and further having a number of trap hooks of varying lengths projecting from the body and being radially disposed about and mostly surrounding the axis.

In accordance with a more detailed aspect of this invention the retriever includes a weighted body having converging walls which form a system of opposing guideways for slidably engaging the fishing line, said system defining an axis along the body, wherein the guideways are oriented along and overlap said axis and are interconnected by means of cross slots.

In accordance with a yet more detailed aspect of this invention the retriever includes a weighted body having an elongated upper section and a ballast belly extending downward from the upper section between guideways. Said guideways are oppositely fixed and together compose a system for engaging the fishing line, which system defines an axis along the body. The retriever also includes a trap section which includes a number of trap hooks which project from the body and are radially disposed about the axis, and a trap sheath projecting forward from the body beyond the hooks and partially surrounding them.

BRIEF DESCRIPTION OF THE DRAWING

FIG. 1 is a side view of a fishing lure retriever constructed in accordance with the present invention and shown in operating position on a fishing line.

FIG. 2 is a side view, partially cut away, of the trap section of the retriever of FIG. 1.

FIGS. 3 and 4 are top and bottom views, respectively, of the same retriever.

FIG. 5 is a sectional view taken at 5—5 in FIG. 1.

FIG. 6 is an end view taken at 6—6 in FIG. 3.

FIG. 7 is a sectional view taken at 7—7 in FIG. 1.

FIG. 8 is a partial sectional view taken at 8—8 in FIG. 3.

FIG. 9 is a side view of a fishing lure retriever constructed in accordance with the present invention.

FIG. 10 is an end view taken at 10—10 in FIG. 9.

FIG. 11 is a side view of a fishing lure retriever constructed in accordance with the present invention.

FIG. 12 is an end view taken at 12—12 in FIG. 11.

FIG. 13 is an end view taken at 13—13 in FIG. 11.

DESCRIPTION OF THE PREFERRED EMBODIMENT

The novel features believed to be characteristic of this invention are set forth in the appended claims. The invention itself, however, may be best understood and its various objects and advantages best appreciated by reference to the detailed description below in connection with the accompanying drawings.

In FIGS. 1 through 8 of those drawings a fishing lure retriever constructed in accordance with the teachings of the present invention is illustrated and generally designated by the number 5. FIG. 1 shows the retriever in normal operating position, slidably suspended from fishing line 7 which is attached to snagged lure 9.

The retriever includes body 12 which is preferably cast of some relatively inexpensive corrosion-resistant metal or alloy such as lead or zinc. Referring to FIG. 5 it can be seen that in cross section the upper portion of the body is generally cylindrical in shape and the lower portion includes ballast belly 14 which exends downward from the upper portion.

It can also be seen in FIG. 5 that converging walls 18 and 20 cooperate to form guideway 22 which is recessed in the underside of the upper portion and extends back to the ballast belly 14. Upper end 26 of the guideway corresponds with axis 24 and has a radius sufficient to permit smooth passage of fishing line typically used in sport fishing. FIG. 6 shows guideway 22' behind the ballast belly. This guideway can be considered a continuation of guideway 22; converging walls 18' and 20' and upper end 26' correspond exactly with their counterparts on the other side of the ballast belly. Thus, between guideways 22 and 22', along the underside of the retriever body, the ballast belly intervenes (FIG. 4). Between them along axis 24, a third and opposing guideway intervenes (FIG. 3). As best shown in FIG. 7, converging walls 19 and 21 cooperate to form guideway 23 which is recessed in the topside of the upper portion. Lower end 27 of this guideway has a radius sufficient to permit smooth passage of the line and overlaps slightly beyond axis 24, thus delineating, in unity with the other guideways, a straight guide channel 25 for slidably engaging the fishing line (FIGS. 1, 6 and 7).

Cross slots 13 and 15 serve to interconnect the guideways to admit the line into the guide channel. A shown in the FIGURES, slot 13 connects guideways 22 and 23, and slot 15 connects 23 and 22'. As best shown in FIGS. 3 and 4, each cross slot cuts slightly more than halfway into the body. Also, the slots are placed on opposite sides of the body for the sake of balance.

The system so constituted by opposing guideways and cross slots is completely open, yet at the same time effectively and slidably locks the line in the retriever. Briefly, it works because, when placed on the line as shown in FIG. 1, the lower guideways straddle the line while the upper guideway cradles it in the opposite direction. Moreover, because fishing line is relatively stiff, and because it is held taut during retrieval, the line tends to stay put in the guideways.

Eyelet 32, which is formed of corrosion-resistant wire, is embedded in the aft end of the retriever and provides a connection for the retrieve line 34. It is located quite close to axis 24 so that force applied to the retriever will be substantially oriented along that axis. In the preferred embodiment the eyelet was embedded during the casting process and ends 36 and 38 were bent at right angles as shown in FIG. 3 to provide a secure anchor for the eyelet. In order to protect the eyelet from damage in the event the retriever is dropped, it has been recessed in indentation 39 as shown.

Retrieve line 34 has a substantially higher tensile strength than fishing line 7 and should be a type of line which resists wear, spools well and stretches relatively little under tensile load. In the preferred embodiment a braided Dacron line having an 80 pound test strength was selected as the retrieve line.

Ballast belly 14 is an integral part of the cast body and extends downward between the guideways, as best shown in FIG. 1. It is streamlined to reduce drag acting upon it as the retriever glides through the water, as well as to enhance its appearance. Its purpose is to lower the body's center of gravity to well below axis 24, so that the retriever tends to remain in the same upright position when placed on fishing line 7. An obvious modification would be to spread the ballast material more evenly along the underside of the retriever, rather than concentrate it in the belly.

One of the most significant aspects of this invention is found in trap section 50 which is located at forward end 30 of the retriever. The trap section houses a number of specially designed and oriented trap hooks which are intended to engage some portion, especially eye 60, of snagged lure 9. Referring to FIG. 8, it can be seen that hook 76 (which is typical) has a straight shank 54 and an abruptly bent pointed barb 56 a its forward end. Aft end 58 of the hook, which is bent at a sharp right angle, serves to anchor the hook securely in the body casting. Preferably, the hook is made from stainless steel or another strong, corrosion-resistant wire. The diameter of the wire is selected so that the hook is substantially stronger than lure hook 59, but is not so large that it will not easily pass through lure eye 60.

In the preferred embodiment the trap section houses seven such trap hooks designated by the numbers 70, 72, 74, 76, 78, 80 and 82 which are radially disposed about and largely surround axis 24. Each of hooks is positioned so that its shank projects forward from inner end 84 of the trap section substantially parallel to axis 24 and its barb extends radially inward toward axis 24. Also, the length l of each hook, as measured from end 84 to the tip of the shank (see FIG. 8), differs so that the barbs are arranged in a staggered array. In the preferred embodiment, for example, the length l for hooks 70, 72, 74, 76, 78, 80 and 82 equals 12, 10, 7, 14, 9.5, 11 and 16 millimeters, respectively. It should be understood, however, that this particular staggered arrangement or these particular lengths are not considered unique by the inventor and that other staggered arrangements may work.

One method suggested by the inventor for embedding the trap hooks in the retriever body involves the combined use of conventional and investment casting. By this method a conventional mold is prepared for the body including the trap sheath. In a separate operation the trap hooks which have been arranged in the desired orientation are encapsulated in a cylinder of investment material having a diameter equal to the inner diamter of the trap section. After the cylinder containing the trap hooks has hardened, it is placed in the mold with the anchor ends of the trap hooks projecting into the retriever body cavity. After the body is poured, the investment material can be chipped away, leaving the hooks embedded in the body and oriented in the desired positions.

Another feature of the trap section is trap sheath 86 which is cylindrical in shape and partially enclosed the array of hooks. It extends foward from the body and preferably is cast as an integral portion of it. The purpose of the sheath is to protect the hooks in the event the retriever is accidentally dropped. Forward end 88 extends foward even with the longest trap hook and is shaped so as to provide protection for each of the hooks. The sheath is unessential to the function of the trap section and may be eliminated if desired.

Referring to FIGS. 9 and 10, an alternative embodiment of the present invention, similar to the embodiment of FIGS. 1-8, includes an elongate body 112, that has an upper cross section that is generally semicylindrical and a lower cross section that is cylindrical. Within the cylindrical lower portion 114 is disposed a guideway 122 that extends along the underside of the upper portion 116 from the forward end 30 of the retriever to the rear end 134 of the retriever. The upper end of the guideway 122 corresponds with the longitudinal axis 24. The guideway 122 is defined by the cylindrical wall of the power portion 114. The guideway 122 has a radius sufficient to permit smooth passage of fishing line typically used in sport fishing, the radius is also sufficient to permit other fishing equipment, such as swivels, or sinkers 100 to pass freely through the guideway 122.

The fishing line 7 is introduced and held within the guideway by the cooperation of lower horizontal slots 102 and upper horizontal slot 104 that are positioned through the outer wall of the lower portion 114. The lower slots 102 communicate with the forward end 30 and the rearward end 134 of the body of the fishing lure retriever. The upper horizontal slot 104 is positioned above and intermediate the lower horizontal slots 102. The upper horizontal slot 104 and lower horizontal slots 102 are connected by vertical slots 108. This allows the fishing line to be easily guided through the wall of the lower portion 114 of the body 112 and into the guideway 122. The offset nature of the lower horizontal slots 102 and upper horizontal slot 104 prevents the fishing line 7 from accidentally escaping from within the guideway 122 when the fishing lure retriever 105 is being used.

Analogously to the fishing lure retriever described with reference to FIGS. 1–8, the fishing lure retriever 105 includes ballast for providing a center of gravity below the axis 24 defined by the upper end of the guideway 122. The fishing lure retriever 105 is connected to retriever line 34 by typing one end of the retriever line 34 through the eyelet 132 positioned in the rear end of the upper portion 116 of the body 112. Similar to the fishing lure retriever described in conjunction with FIGS. 1–8, the fishing lure retriever 105 includes a trap section 50 located at the forward end 30 of the upper portion 116 of the fishing lure retriever 105.

Similar to the preferred embodiment in FIGS. 1–8, the trap section houses five trap hooks designated by the numbers 72, 74, 76, 78, and 80, which are radially disposed about the axis 24 and project varying lengths from the body 112. The trap hooks themselves are substantially similar to those described with regard to the fishing lure retriever 5 described with reference to FIGS. 1–8.

Referring to FIGS. 11–13, another embodiment of the present invention, fishing lure retriever 205, includes an elongate body 212 that has a substantially oval cross section. An oval guideway 222 passes through the center of the elongate body 212 from the forward end 30 to the rear end 134. The upper and lower portions of the guideway 222 define axes 24 and 24'. The guideway 222 has a radius sufficient to permit smooth passage of fishiing line typically used in sport fishing. The fishing line 7 may be introduced into the guideway 222 within the body 212 by passing the fishing line through the horizontal slots 110, 104, 102 and the vertical slots 108 that communicate between the exterior of the body 212 and the interior guideway 222. The rear end 134 of the body 212 includes fastener 106 that vertically bridges the guideway 222 in such a manner as not to obstruct the passage of the fishing line 7 through the guideway. The fastener 106 may be embedded within the body 212 similar to the way the eyelet 32 is fastened within the body 12 in FIG. 1. Fastener 106 serves as a means for connecting the body to retriever line 34.

Located at the forward end 30 of the upper 116 and lower portions 114 of the retriever body 212 are mirror-image trap sections 50 and 50'. As with the trap section 50 described with reference to FIG. 10, a number of specially designed and oriented trap hooks 72, 74, 76, 78 and 80 and 72', 74', 76', 78' and 80' are radially disposed about axes 24 and 24'. The trap hooks are similar to those described hereinbefore with reference to FIGS. 1–10. Due to the design of the trap sections 50 and 50' as mirror images of each other, the fishing lure retriever illustrated in FIGS. 11–13 is equally effective with trap section 50 positioned above trap section 50', or vice versa. Depending upon which trap section is positioned above the axis 24, the opposing trap secion and lower portion of the body 212 provides the necessary ballast to provide a center of gravity below the axes 24 or 24'.

The weight of the retriever is not critical but it must be sufficient that it will sink easily and slide rapidly along a submerged, downwardly inclined fishing line. When placed on a fishing line as shown in FIG. 1, the retriever will be urged forward or to the right along the line by the componen of gravity acting along the line. The more shallow the angle of the fishing line with respect to the horizontal, the smaller that component will be. The forces that tend to retard motion of the retriever along the line include the resistance of the fishing line as it passes through the guide channel, the drag of the retrieve line, and the hydrodynamic drag of the body as it moves through the water.

In some situations if the lure becomes snagged near the surface of the water the angle of declination of the line may only be ten or fifteen degrees, so the weight must be sufficient to overcome these various resistances and permit the retriever to move forward along the line. It would appear that the heavier the body the better, but, obviously, due to the limited strength of the fishing line carrying the retriever, the weight must be limited. For example, the weight of the preferred embodiment is approximately 5 ounces.

It is suggested for convenient operation of the retriever that the retrieve line be stored on a reel which can be operated by the fisherman. Preferably the reel should include a spool which can be permitted to run free when the retrieve line is being dispensed, means for winding the spool in order to recover the retrieve line, and a ratchet which can be engaged to prevent the spool from unwinding during recovery. Details of the construction of such a reel should be obvious to those of ordinary skill in the art.

The retriever is primarily designed for use with fresh water lures, but it is easily adaptable for use with many salt water lures. Because it is constructed from corrosion-resistant materials it will not be subjected to the corrosion that plagues most salt water fishing gear.

To use the retriever, a fisherman begins by grasping the fishing line in one hand and the retriever in the other. If the retriever is used with an accessory reel, as suggested, the same hand that holds the line may also hold the reel. Because of the openness of its guideway system, only one hand is really needed to place the retriever on the line as shown in FIG. 1. By alternately tipping andd turning the retriever, the fishing line may be positioned in the guide channel. This accomplished, the fisherman pulls the fishing line taut and lets the retriever slide down to the snagged lure. If the angle of the line with respect to the horizontal is so shallow that the retriever either will not proceed or moves very slowly down the line, then the angle should be increased by raising the tip of the fishing pole.

The retriever is uniquely designed to take advantage of a common feature of practically all fishing lures, which is a connecting eye similar to lure eye 60. Of course, it can also engage other irregularities in the forward portion of the lure such as snaps, swivels, split rings and so forth. As the retriever descends, fishing line 7 is drawn directly through the center of trap section 50 substantially along axis 24. Accordingly, when the retriever reaches the lure, eye 60 will be drawn directly into the center of the trap section and some part of the lure will impact the retriever. This impact is felt through the fishing line by the fisherman, who then should stop further rotation of the reel spool. Next, the fisherman slowly begins to rewind retrieve line 34, and some forward part of the lure will likely be captured in the trap section.

The retriever may free a snagged lure by hooking a part of it with one of the trap hooks, by wedging or trapping a part in the spaces between the trap hooks, or upon impact by hammering the lure backward. In engaging the lure, the trap section functions somewhat like a three-dimensional pinball machine. Because the barbs of the trap hooks point rearward, lure eye 60 or other forward parts of the lure are permitted to penetrate the trap section. And because the trap hooks are made of springy wire, their long shanks flex somewhat to let parts penetrate even farther. Also, because the retriever can rock and rotate slightly on the fishing line, it is possible for the trap section to rotate or move laterally to accommodate parts as they enter. As the retriever is drawn backward, however, each barb becomes an obstacle to the exit of that part. The part will be rotated, shunted and prodded from all sides as it is drawn through the array of barbs, and it is highly likely that in the proces it will become hooked or trapped between them. If the lure is not engaged on the first attempt, the fisherman should continue to slowly jig the retriever until engagement occurs. Accordingly, the inventor believes that this unique arrangement of staggered hooks offers a much higher probability of capturing the lure than is found in previously known retrievers.

Once the lure is captured, the fisherman engages the ratchet on the reel, pulls smoothly and steadily until the lure is freed, and then reels up the retriever and the lure. With a reshaping or replacement of fishing hook 59, the lure is again ready for use.

Thus, it can be seen that the present invention provides for an improved retriever for recovering snagged fishing lures which incorporates many novel features and offers significant advantages over the prior art. Although only one embodiment of this invention has been illustrated and described, it is to be understood that obvious modifications can be made of it without departing from the true scope and spirit of the invention.

The embodiments of the invention in which an exclusive property or privilege is claimed are defined as follows:

1. A fishing lure retriever comprising:
   a weighted body, including engaging means for slidably engaging a fishing line attached to the lure, said engaging means defining an axis with respect to the body, said body including an elongate upper portion and ballast for providing a center of gravity beneath said axis between the ends of the weighted body; and
   a plurality of trap hooks of varying lengths, fixedly projecting from the body and radially disposed about the axis and defining a channel of hooks that is located about the axis.

2. The fishing lure retriever of claim 1, wherein the ballast extends along the underside of said elongated upper portion.

3. The fishing lure retriever of claim 1, further comprising a trap sheath extending forward from the body beyond the hooks and partially surrounding them.

4. The fishing lure retriever of claim 1, further comprising: means for recovering the retriever including a line attached to the body and having a higher tensile strength than the fishing line.

5. The retriever of claim 1, wherein the engaging means includes opposing guideways formed by converging walls of said body, oriented along and overlapping said axis, and interconnected by meanss of cross slots.

6. The fishing lure retriever of claim 1, wherein the first and second plurality of trap hooks fixedly project to varying lengths from the body.

7. A fishing lure retriever comprising:
   a weighted body, including engaging means for slidably engaging a fishing line attached to the lure, said engaging means defining an axis with respect to the body, said body including an elongate upper portion and ballast for providing a center of gravity beneath said axis between the ends of the weighted body; and
   a plurality of trap hooks, fixedly projecting to varying lengths from the body and radially disposed about the axis and defining a channel of hooks that is located about the axis.

8. A fishing lure retriever comprising:
   a weighted body, including a first and a second engaging means, each capable of defining an upper and a lower axis with respect to the body, said body including ballast for providing a center of gravity beneath said upper axis between the ends of the weighted body; and
   a first and second plurality of trap hooks of varying lengths fixedly projecting from the body and radially disposed about the upper and lower axis and defining a channel of hooks that surrounds each axis.

* * * * *

UNITED STATES PATENT AND TRADEMARK OFFICE
CERTIFICATE OF CORRECTION

PATENT NO. : 4,885,863
DATED : December 12, 1989
INVENTOR(S) : Michael M. Sprague It is certified that error appears in the above-identified patent and that said Letters Patent is hereby corrected as shown below:

| Column | Line | Error |
|---|---|---|
| 1 | 32 | "cosst" should be --cost-- |
| 3 | 18 | "A" should be --As-- |
| 4 | 41 | "enclosed" should be --encloses-- |
| 4 | 42 | "foward" should be --forward-- |
| 4 | 46 | "foward" should be --forward-- |
| 5 | 43 | "fishiing" should be --fishing-- |
| 6 | 1 | "secion" should be --section-- |
| 6 | 9 | "componen" should be --component-- |
| 6 | 40 | "subjected" should be --subject-- |
| 6 | 49 | "andd" should be --and-- |
| 7 | 23 | "proces" should be --process-- |

Signed and Sealed this

Twenty-fifth Day of February, 1992

Attest:

HARRY F. MANBECK, JR.

*Attesting Officer*  *Commissioner of Patents and Trademarks*